US008331386B2

(12) United States Patent
Carmon et al.

(10) Patent No.: US 8,331,386 B2
(45) Date of Patent: Dec. 11, 2012

(54) CRC CHECKING AND MAC-HS PROCESSING IN AN HSDPA-COMPATIBLE RECEIVER IN A 3G WIRELESS NETWORK

(75) Inventors: Rafael Carmon, Rishon le Zion (IL); Simon Issakov, Bethlehem, PA (US)

(73) Assignee: Agere Systems LLC, Allentown, PA (US)

( * ) Notice: Subject to any disclaimer, the term of this patent is extended or adjusted under 35 U.S.C. 154(b) by 397 days.

(21) Appl. No.: 11/755,999

(22) Filed: May 31, 2007

(65) Prior Publication Data

US 2008/0186988 A1    Aug. 7, 2008

(51) Int. Cl.
   *H04L 12/28* (2006.01)
(52) U.S. Cl. ......... 370/412; 370/278; 370/469; 714/758
(58) Field of Classification Search .................. None
   See application file for complete search history.

(56) References Cited

U.S. PATENT DOCUMENTS

| | | | |
|---|---|---|---|
| 7,116,667 B2 | 10/2006 | Jiang et al. | |
| 7,298,730 B2 | 11/2007 | Wu | |
| 7,426,671 B2 | 9/2008 | Kimura | |
| 7,444,169 B2 | 10/2008 | Ishii et al. | |
| 7,535,886 B2 | 5/2009 | Lee et al. | |
| 2001/0033582 A1 | 10/2001 | Sarkkinen et al. | |
| 2002/0191544 A1 | 12/2002 | Cheng et al. | |
| 2005/0144339 A1* | 6/2005 | Wagh et al. | 710/36 |
| 2005/0180371 A1* | 8/2005 | Malkamaki | 370/342 |
| 2005/0243743 A1* | 11/2005 | Kimura | 370/278 |
| 2006/0002416 A1 | 1/2006 | Yagihashi | |
| 2006/0034175 A1* | 2/2006 | Herrmann | 370/236 |
| 2006/0056637 A1 | 3/2006 | Rezaiifar et al. | |
| 2007/0081612 A1* | 4/2007 | Chang et al. | 375/316 |

FOREIGN PATENT DOCUMENTS

| | | |
|---|---|---|
| EP | 1 592 161 A2 | 11/2005 |
| JP | 2005318429 A | 11/2005 |
| JP | 2006020044 A | 1/2006 |

(Continued)

OTHER PUBLICATIONS

"UMTS Evolution to High Speed Downlink Packet Access," Douglas McCarthy, EETS 8316 Term Paper, Dec. 1, 2003, [retrieved on Feb. 2, 2007] Retrieved from the Internet: <URL: http://engr.smu.edu~jseraj/2003_termpapers/Douglas%20Mc%20Carthy%20Term_Paper_HSDPA.doc>, pp. 1-13.

(Continued)

*Primary Examiner* — Phirin Sam
*Assistant Examiner* — Nicholas Sloms
(74) *Attorney, Agent, or Firm* — Mendelsohn, Drucker & Associates, P.C.; Edward J. Meisarosh; Steve Mendelsohn

(57) ABSTRACT

In one embodiment, a method for processing a transport block having a MAC-hs protocol data unit (PDU) and a corresponding checksum in an HSDPA-compatible (high-speed downlink packet access) receiver in a 3GPP wireless communication network, the method including: (a) recovering the transport block, (b) performing, substantially in parallel: (i) a cyclic redundancy check (CRC) on the transport block to determine whether the transport block passes or fails, and (ii) MAC (media access control) disassembly to generate a modified MAC-hs PDU, and (c) determining whether to perform reordering-queue distribution and reordering on the modified MAC-hs PDU based on whether the transport block passes or fails. By performing the CRC check and disassembly substantially in parallel, processing efficiencies may be gained.

22 Claims, 4 Drawing Sheets

FOREIGN PATENT DOCUMENTS

JP  2006020133 A  1/2006

OTHER PUBLICATIONS

"3rd Generation Partnership Project; Technical Specification Group Services and System Aspects; 3G Security; Security Architecture (Release 5)," [retrieved on Jan. 23, 2007] Retrieved from the Internet: <URL: http://http://www.3gpp.org/ftp/Specs/html-info/33102.htm>, pp. 1-61.

"Universal Mobile Telecommunications System (UMTS); Medium Access Control (MAC) protocol specification (3GPP TS 25.321 version 6.7.0 Release 6)"; ETSI TS 125 321, ETSI Standards, European Telecommunications Standards Institute, Sophia-Antipo, FR, vol. 3-R2, No. V670, Dec. 2005, pp. 1-94, XP014032593.

"Universal Mobile Telecommunications System (UMTS); 3G security; Security architecture (3GPP TS 33.102 version 7.0.0 Release 7)"; ETSI TS 133 102, ETSI Standards, European Telecommunications Standards Institute, Sophia-Antipo, FR, vol. 3-SA3, No. V700, Dec. 2005, pp. 1-65, XP014032863.

"3rd Generation Partnership Project; Technical Specification Group Radio Access Network; Multiplexing and channel coding (FDD) (Release 7)," 3GPP (3rd Generation Partnership Project) TS 25.212 V7.4.0 (Mar. 2007) Technical Specification, 3GPP Organisational Partners Publications, [Retrieved on Apr. 9, 2007], Retrieved from the Internet: <URL: http://www.3gpp.org/ftp/Specs/html-info/25321.html> (57 pages).

"3rd Generation Partnership Project; Technical Specification Group Radio Access Network; Medium Access Control (MAC) Protocol Specification (Release 5)," 3GPP (3rd Generation Partnership Project) TS 25.321 V5.12.0 (Sep. 2005) Technical Specification, 3GPP Organisational Partners Publications, [Retrieved on Jan. 30, 2006], Retrieved from the Internet: <URL: http://www.3gpp.org/ftp/Specs/html-info/25321.html> (100 pages).

"Integrated Circuits for 3GPP Mobile Wireless Systems," by Chris Nicol and Matthew Cooke, Bell Laboratories, Lucent Technologies [Retrieved on Apr. 18, 2007], Retrievable from the Internet: <URL: http://wwwieeexplore.ieee.org/iel5/7911/21814/01012850.pdf> 2001 (8 pages).

Medium Access Control (MAC) Protocol Specification (Release 6), TS25.321, 3GPP, Dec. 22, 2005, V6.7.0, pp. 16, 17, 34, and 35, URL (http://www.3gpp.org/ftp/Specs/archive/25_series/25.321/25321-670.zip).

* cited by examiner

CRC CHECKING AND MAC-HS PROCESSING IN AN HSDPA-COMPATIBLE RECEIVER IN A 3G WIRELESS NETWORK

CROSS-REFERENCE TO RELATED APPLICATION

This application contains subject matter related to the subject matter of PCT Patent Application No. PCT/US07/61766, filed Feb. 7, 2007, and which is incorporated herein by reference.

BACKGROUND OF THE INVENTION

1. Field of the Invention

The present invention relates to wireless communication systems, and more particularly to transmission protocols used by third-generation (3G) wireless communication systems.

2. Description of the Related Art

One category of mobile telephony communication devices, or mobile phones, includes third-generation devices. Third-generation (3G) mobile phones use digital radio signals for communication with cell towers, also known as base stations. Third-generation mobile phones are able to simultaneously transfer multiple data streams, such as voice, e-mail, instant messages, and streaming audio or video. Third-generation mobile phones additionally allow for high rates of data transfers and broadband capabilities. The high rates of data transfers rely on efficient organization and transmission of data to and from the applications running on a mobile phone. The organization and transmission of data is defined by protocols and standards.

Third-generation mobile phone standards are set by the Third Generation Partnership Project (3GPP) and are based on Universal Mobile Telecommunications System (UMTS) network technology. UMTS evolved from Global System for Mobile Communication (GSM) network technology. The 3GPP comprises several Technical Specification Groups (TSGs) that are responsible for various areas of third-generation technology. One way to categorize 3G technology is by layer levels and protocols. The 3G protocol stack includes at least three layers: (i) layer 1, also known as the physical layer, (ii) layer 2, also known as the data link layer, and (iii) layer 3, also known as the network layer. The physical layer handles communication between the mobile phone and a base station, the data link layer interfaces between the physical and network layers, and the network layer handles communication with applications on a mobile phone.

Layer 1 architecture and design is specified by Working Group 1 (WG1) of the Radio Access Network (RAN) TSG. This includes the specification of the physical channel structures, the mapping of transport channels to physical channels, spreading, modulation, physical layer multiplexing, channel coding, and error detection. Among the technical specifications (TS) provided by TSG RAN WG1 is TS 25.212, which is a multiplexing and channel-coding specification. TS 25.212 is periodically updated and multiple releases are published, including in conjunction with new releases of the 3GPP standard. A list of releases of TS 25.212 is presently available on the Internet at http://www.3gpp.org/ftp/Specs/html-info/25212.htm.

Layer 2 architecture and design is regulated by Working Group 2 (WG2) of the RAN TSG, which is in charge of the radio interface architecture and protocols (Media Access Control (MAC), Radio Link Control (RLC), Packet Data Convergence Protocol (PDCP)), the specification of the Radio Resource Control (RRC) protocol, the strategies of radio resource management, and the services provided by the physical layer to the upper layers. Among the technical specifications (TS) provided by TSG RAN WG2 is TS 25.321, which is the MAC protocol specification. TS 25.321 is periodically updated and multiple releases are published, including in conjunction with new releases of the 3GPP standard. A list of releases of TS 25.321 is presently available on the Internet at http://www.3gpp.org/ftp/Specs/html-info/25321.htm. The MAC protocol specifies, among other things, (i) communication channels and (ii) protocol data units (PDUs), formats, and parameters, for communication between the physical layer and the RLC layer of a mobile phone.

Release 5 of the 3GPP standard introduced the High-Speed Downlink Packet Access (HSDPA) protocol, which allows for the high-speed download of data to a mobile telephony device, referred to as user equipment (UE), from a base station, referred to as a Node-B. A Node-B is part of the UMTS Terrestrial Radio Access Network (UTRAN). Releases 6 and 7 of the 3GPP standard also include the HSDPA protocol, and later releases are expected to include it as well.

A MAC-layer entity called MAC-hs (MAC-high speed) controls a High Speed Downlink Shared Channel (HS-DSCH) that is used by the HSDPA protocol. A MAC-hs entity in a UE performs functions related to, but different from, the functions of a MAC-hs entity in a corresponding Node-B with which the UE is communicating over an HS-DSCH. An HS-DSCH might carry data for multiple UE processes. Unless otherwise indicated, references herein to entities refer to logical entities in a UE.

The operations of functional units in 3GPP-compatible devices operating according to the 3GPP standard are not necessarily optimized. Efficiency improvements in 3GPP-compatible devices could reduce power consumption by UEs and/or per-unit manufacturing costs for UEs.

SUMMARY OF THE INVENTION

In one embodiment, the invention can be a method for processing a transport block in a receiver in a communication network, the method comprising: (a) recovering the transport block comprising a first-type protocol data unit (PDU) and a corresponding checksum, (b) performing, substantially in parallel: (i) a first set of media access control (MAC) processing functions on the first-type PDU to generate a first set of MAC results, and (ii) a cyclic redundancy check (CRC) on the transport block to determine whether the transport block passes or fails. If the CRC check determines that the transport block passes, then indicating that a second set of MAC processing functions is to be performed. If the CRC check determines that the transport block fails, then not indicating that the second set of MAC processing functions is to be performed.

In another embodiment, the invention can be a receiver for a communication network, the receiver adapted to process a transport block, the receiver comprising: (a) one or more processing functions adapted to recover the transport block comprising a first-type PDU and a corresponding checksum, (b) a first MAC entity adapted to perform a first set of MAC processing functions on the first-type PDU to generate a first set of MAC results, and (c) a CRC check entity adapted to perform, substantially in parallel with the first MAC entity, a CRC check on the transport block to determine whether the transport block passes or fails. If the CRC check entity determines that the transport block passes, then the CRC check entity indicates that a second set of MAC processing functions is to be performed. If the CRC check determines that the transport block fails, then the CRC check entity does not indicate that the second set of MAC processing functions is to be performed.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
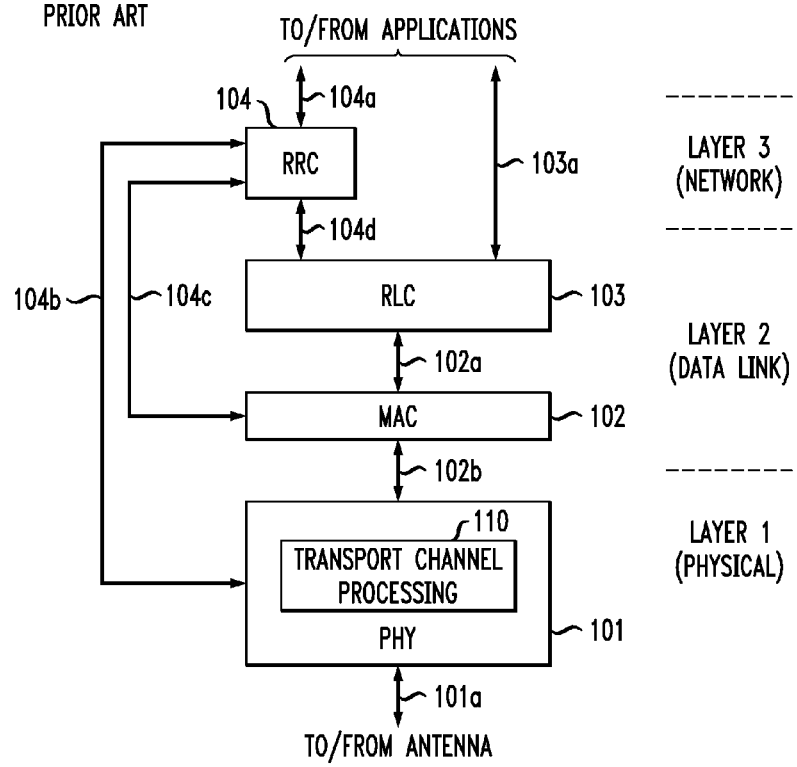
FIG. 1 shows a simplified partial block diagram of the 3G protocol stack.

FIG. 1 shows a simplified partial block diagram of the 3G protocol stack in an exemplary UE. The various communication paths shown can be direct or indirect and can include intermediary elements which are not shown in the figure or described herein. Layer 1 comprises physical layer 101, which communicates with an antenna (not shown) via path 101a and with layer 2 via path 102b. Physical layer 101 includes transport channel processing module 110, which communicates with (i) the antenna via other components of physical layer 101, and (ii) layer 2 via path 102b. Path 102b comprises signaling and transport channels. Transport channels are data flows between the data link layer and the physical layer. Data in the transport channels is organized into packets. Outgoing transport channels can be combined onto composite transport channels for radio transmission between a mobile phone and a base station using physical layer 101.

Layer 2 comprises Media Access Control (MAC) layer 102 and Radio Link Control (RLC) layer 103, which communicate via path 102a, wherein path 102a comprises logical channels. Logical channels are data flows within layer 2 associated with applications running on the mobile phone. The data flows are organized into packets in the logic channels. RLC layer 103 may contain a decryption entity (not shown) that functions to decrypt data that was encrypted by a corresponding encryption entity in a corresponding Node-B.

Layer 3 includes Radio Resource Controller (RRC) entity 104, which controls and communicates with physical layer 101, MAC layer 102, and RLC layer 103 via paths 104b, 104c, and 104d, respectively. RRC 104 communicates with applications running on the mobile phone via path 104a. RLC layer 103 can also communicate with applications running on the mobile phone via path 103a, either directly or through intermediary entities (not shown) in layer 3.

Figure 2:
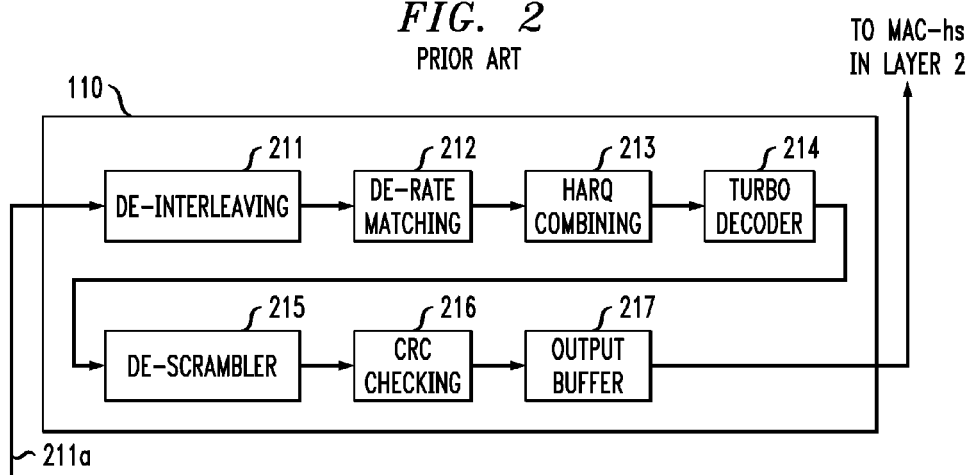
FIG. 2 shows a simplified block diagram of processing functions in the transport channel processing module of FIG. 1.

FIG. 2 shows a sample simplified block diagram of processing entities in transport channel processing module 110 of FIG. 1. Transport channel processing module 110 comprises de-interleaving module 211, de-rate matching module 212, HARQ (Hybrid Automatic Repeat Request) combining module 213, turbo decoder 214, de-scrambler 215, CRC checking module 216, and output buffer 217. De-interleaving module 211 receives, via path 211a, a digital signal from an entity (not shown) of physical layer 101 that receives a signal from an antenna (not shown) and processes it to provide the signal on path 211a. Signal 211a is processed by transport channel processing module 110, which recovers one or more transport blocks from signal 211a and then provides an output to MAC layer 102 via path 102b.

De-interleaving module 211 reverses interleaving performed by an interleaving module in a corresponding Node-B with which the UE communicates. De-rate matching module 212 receives the output of de-interleaving module 211 and reverses rate-matching performed by a rate-matching module in the corresponding Node-B. HARQ combining module 213 receives the output of de-rate matching module 212 and performs soft combining between retransmissions, if necessary. Soft combining involves combining soft information from previous, error-affected, transmissions with a current retransmission to increase the probability of a successful decoding of the transmission. Turbo decoder 214 receives the output of HARQ combining module 213 and reverses the encoding performed by a turbo encoder in the corresponding Node-B. De-scrambler 215 receives the output of turbo decoder 214 and reverses the scrambling performed by a scrambler in the corresponding Node-B. CRC (cyclic redundancy check) checking module 216 receives the output of de-scrambler 215, which is in the form of recovered transport blocks, and checks each received transport block to determine whether the transport block has transmission errors.

Cyclic redundancy check (CRC) is a generic term for a common transmission-error-detection mechanism used in communications systems. CRC generation, by a transmitter, involves calculating a number, called a checksum, also known as parity bits, based on a transport block, and appending that checksum to the transport block for transmission to a receiver. CRC checking, by a receiver, involves calculating a checksum based on the received transport block and comparing that receiver-calculated checksum to the appended checksum, and if the two checksums do not match, then determining that a transmission error has occurred. Numerous algorithms for generating a checksum for a transport or data block exist.

If CRC checking module 216 determines that a transport block was properly transmitted, then CRC checking module 216 provides that transport block, stripped of the checksum portion, to output buffer 217 and provides a data read signal, such as an interrupt, to layer 2 and/or layer 3 indicating that there is data to be read in output buffer 217. The output of CRC checking module 216, i.e., the transport block without the checksum portion, is a MAC-hs protocol data unit (PDU). Output buffer 217 in turn allows the reading of the MAC-hs PDU by a MAC-hs entity in MAC layer 102 of FIG. 1.

If CRC checking module 216 determines that a transport block was not properly transmitted, then a request for retransmission of that transport block is generated for uplink to a corresponding Node-B. This request for a retransmission can be in the form of a NACK generated by a HARQ entity. The corresponding MAC-hs PDU may nevertheless be forwarded to output buffer 217, but since no data read signal is sent for that MAC-hs PDU, that MAC-hs PDU will not be read by the MAC-hs entity in MAC layer 102. Instead, that MAC-hs PDU will be overwritten in output buffer 217 by the next MAC-hs PDU.

Figure 3:
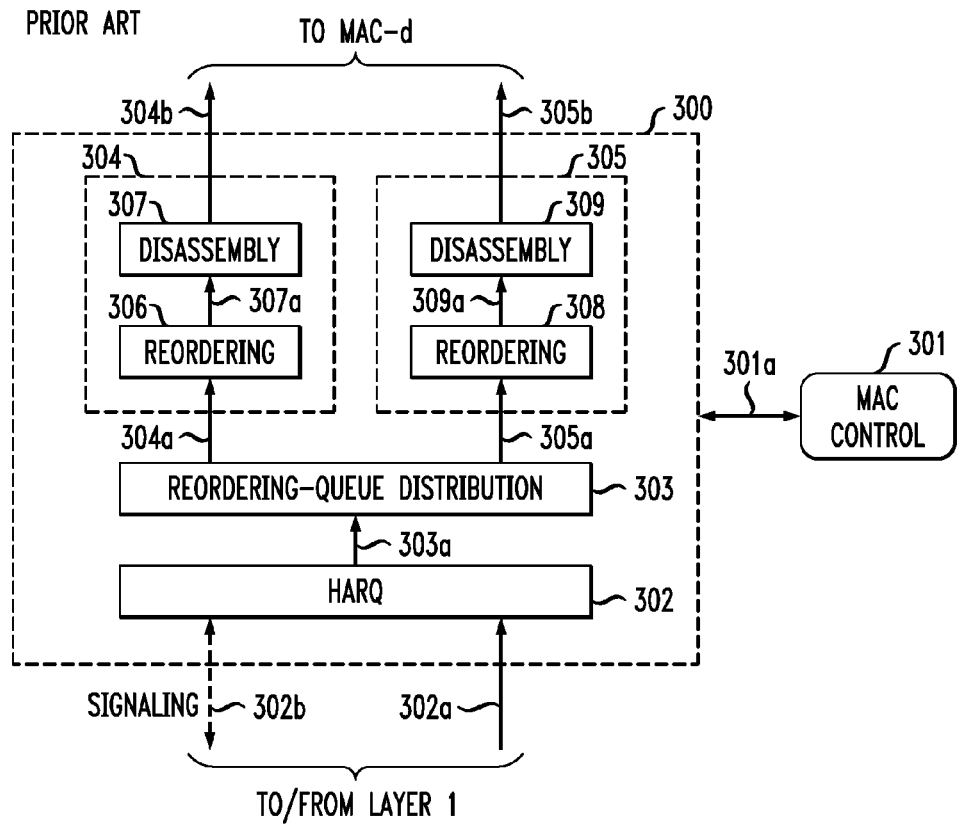
FIG. 3 shows a simplified block diagram of the architecture of a UE-side MAC-hs entity in accordance with Release 5 of the 3GPP standard.

FIG. 3 shows a simplified block diagram of the architecture of UE-side MAC-hs entity 300 in accordance with Release 5 of the 3GPP standard. MAC-hs entity 300, which is located in MAC layer 102 of FIG. 1, receives MAC-hs PDUs from layer 1, processes them, and passes the processed results, in the form of MAC-d PDUs, to a MAC-d entity (not shown) also located in MAC layer 102. For example, MAC-hs entity 300 can receive MAC-hs PDUs from output buffer 217 of FIG. 2 via path 302a. MAC-hs entity 300 is controlled by MAC control entity 301 via path 301a. MAC-hs entity 300 communicates with the MAC-d entity via paths such as 304b and 305b, and communicates with layer 1 entities via paths 302a and 302b. MAC-hs entity 300 comprises HARQ entity 302, reordering-queue distribution entity 303, and one or more reordering queues, such as reordering queues 304 and 305. Reordering queue 304 comprises reordering entity 306 and disassembly entity 307, while reordering queue 305 comprises reordering entity 308 and disassembly entity 309. Disassembly entity 309 extracts and output MAC-d PDUs from received MAC-hs PDUs.

Each reordering queue in MAC-hs 300 corresponds to a particular process in the UE. There may be a limit on the number of queues a MAC-hs entity will handle. For example, in Release 5 of the 3GPP standard, the limit is eight queues. A more comprehensive description of the operation of MAC-hs entities such as MAC-hs entity 300 appears in above-cited PCT Patent Application No. PCT/US07/61766. It should be noted that some of the functions regulated by HARQ entity 302 are performed by a HARQ entity in physical layer 101 of FIG. 1, such as HARQ combining module 213 of FIG. 2, wherein HARQ entity 302 configures parameters for performance of those functions.

In a typical UE, entities of different protocol-stack layers are implemented using different specialized processors. For example, MAC-hs functionality is typically implemented in a Protocol Stack (PS) processor. PS processors are typically implemented using Advanced RISC (reduced instruction set computer) Machine (ARM) processors. Layer 1 functionality is typically implemented in a baseband processor, which is a type of DSP, and is designed to efficiently handle bit-shifting and other bit-intensive operations. Baseband processors typically perform modem-like functions for the UE. In general, operations in a baseband processor are bit-oriented, while operations in a PS processor are byte- and word-, i.e., multi-byte memory unit, oriented.

Figure 4:
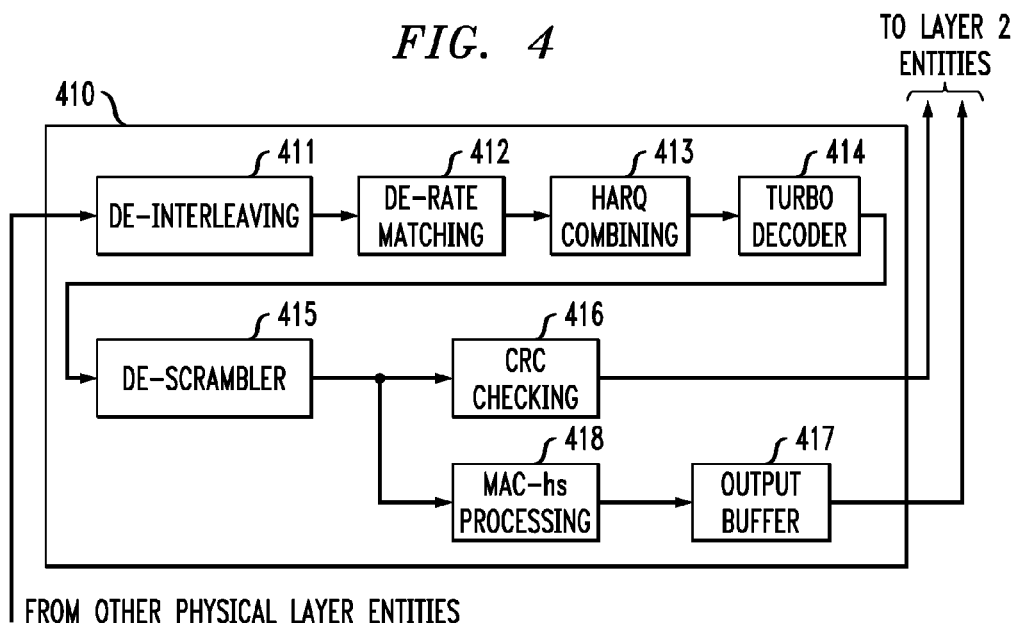
FIG. 4 shows a simplified block diagram of processing functions in a transport channel processing module in accordance with an embodiment of the present invention.

FIG. 4 shows a simplified block diagram of processing entities in transport channel processing module 410 in accordance with an embodiment of the present invention. The processing entities may be embodied, for example, as sections of an integrated circuit, or as segments of software code. Transport channel processing module 410 comprises entities similar to the entities of transport channel processing module 110 of FIG. 2, and the similar entities are similarly numbered, but with a different prefix. Transport channel processing module 410 comprises de-interleaving module 411, de-rate matching module 412, HARQ combining module 413, turbo decoder 414, and de-scrambler 415, which all function in substantially the same way as the corresponding entities in transport channel processing module 110 of FIG. 2. However, CRC checking in transport channel processing module 410 functions substantially in parallel to MAC-hs processing.

The output of de-scrambler 415, which output is a transport block comprising a MAC-hs PDU and a checksum, is provided to both CRC checking module 416 and MAC-hs processing module 418. Since the CRC checking process does not change the contents of the MAC-hs PDU in the transport block being checked, MAC-hs processing module 418 can start to process the constituent MAC-hs PDU of the transport block while CRC checking module 416 is determining whether that transport block was properly transmitted. MAC-hs processing module 418 provides its output to output buffer 417.

CRC checking module 416 determines whether a received transport block was properly transmitted in substantially the same way as CRC checking module 216 of FIG. 2. An output of CRC checking module 416 indicates whether the transport block was properly transmitted. This output can be in any one of numerous possible forms, as would be appreciated by one of ordinary skill in the art. This output is provided to an appropriate layer 2 entity. An output can also be provided to other layer 1 entities.

If CRC checking module 416 determines that the transport block was properly transmitted (i.e., passed), then CRC checking module 416 signals an appropriate entity in layer 2 to read the data stored in output buffer 417. The identity of the appropriate entity depends on which processing steps are performed by MAC-hs processing entity 418. For example, if MAC-hs processing module 418 performs all of the functions of a MAC-hs entity, then the appropriate entity would be a MAC-d entity. If CRC checking module 416 determines that the transport block was not properly transmitted (i.e., failed), then (i) no data read signal is provided and thus, the data stored in output buffer 417 will be overwritten by the output of MAC-hs processing module 418 for the next transport block, and (ii) a request for retransmission of that transport block is generated for uplink to a corresponding Node-B.

CRC checking module 416 and MAC-hs processing module 418 each process a transport block at the rate of about one clock cycle per bit of data. Since MAC-hs processing module 418 does not process the checksum portion of a transport block, MAC-hs processing module 418 takes less time to process a transport block than does CRC checking module 416. Since CRC checking module 416 and MAC-hs processing module 418 operate in parallel on the same transport block, if the transport block passes the CRC check, then the processing time for the transport block is reduced by the time for MAC-hs processing compared to the processing time for the transport block that would be required by transport channel processing module 110 of FIG. 2. If the transport block fails the CRC check, then the processing time for the transport block is substantially the same as the processing time for the transport block that would be required by transport channel processing module 110.

MAC-hs processing module 418 receives a transport block but utilizes only the constituent MAC-hs PDU and strips off or ignores the checksum portion. MAC-hs processing module 418 can perform some or all of the functions of a MAC-hs module, such as MAC-hs module 300 of FIG. 3. MAC-hs processing module 418 may be implemented in a baseband processor with other layer 1 entities, or MAC-hs processing module 418 may be implemented in a PS processor with other layer 2 entities.

In one implementation, MAC-hs processing module performs all of the functions of a MAC-hs module and is implemented in the PS processor. In this implementation, MAC-hs processing module 418 would output MAC-d PDUs to output buffer 417, also implemented in the PS processor. Output buffer 417 would, in turn, provide MAC-d PDUs, subject to CRC checking determination, to a MAC-d entity implemented in the PS processor.

In another implementation, MAC-hs processing module 418 performs all the functions of a MAC-hs module but is implemented in the baseband processor. In this implementation, MAC-hs processing module 418 would output MAC-d PDUs to output buffer 417, which, in turn, would provide MAC-d PDUs, subject to CRC checking determination, to a MAC-d entity implemented in the PS processor.

A more efficient use of a baseband processor and an affiliated PS processor may be obtained by (i) having the baseband processor perform the disassembly functions of a MAC-hs entity in parallel with CRC checking, and (ii) having the PS processor perform HARQ configuration, reordering-queue distribution, and reordering functions of a MAC-hs entity, subject to the CRC checking determination. Bit-shifting operations, such as those that might be required in CRC checking and disassembling MAC-hs PDUs, are typically performed more efficiently by processors with high MIPS (millions of instructions per second) ratings.

CRC checking and disassembly might require a vast number of bit manipulations and might create a processing bottleneck for a PS processor, especially with the high data rates possible using the HSDPA protocol. The operation of a UE might be more efficient if the disassembly functions of the UE were performed by a baseband processor, in parallel with CRC checking, rather than by a PS processor. Similarly, since decryption may require multiple bit-manipulating operations, it might be more efficient to perform decryption in the baseband processor rather than in the PS processor, as more fully described in above-cited PCT Patent Application No. PCT/US07/61766.

In one implementation, MAC-hs processing module 418 is implemented in the baseband processor and performs only the disassembly functions of a MAC-hs entity. In this implementation, MAC-hs processing module 418 would output to output buffer 417 data packets, such as the modified MAC-hs PDUs described in above-cited PCT Patent Application No. PCT/US07/61766. Output buffer 417 would in turn provide the modified MAC-hs PDUs, subject to CRC checking determination, to a layer 2 MAC-hs processing entity implemented in a PS processor, wherein the layer 2 MAC-hs processing entity would perform the HARQ configuration, reordering-queue distribution, and reordering functions of a MAC-hs entity. Additional details about the implementation of a MAC-hs entity over both a baseband and a PS processor are provided in above-cited PCT Patent Application No. PCT/US07/61766.

Figure 5:
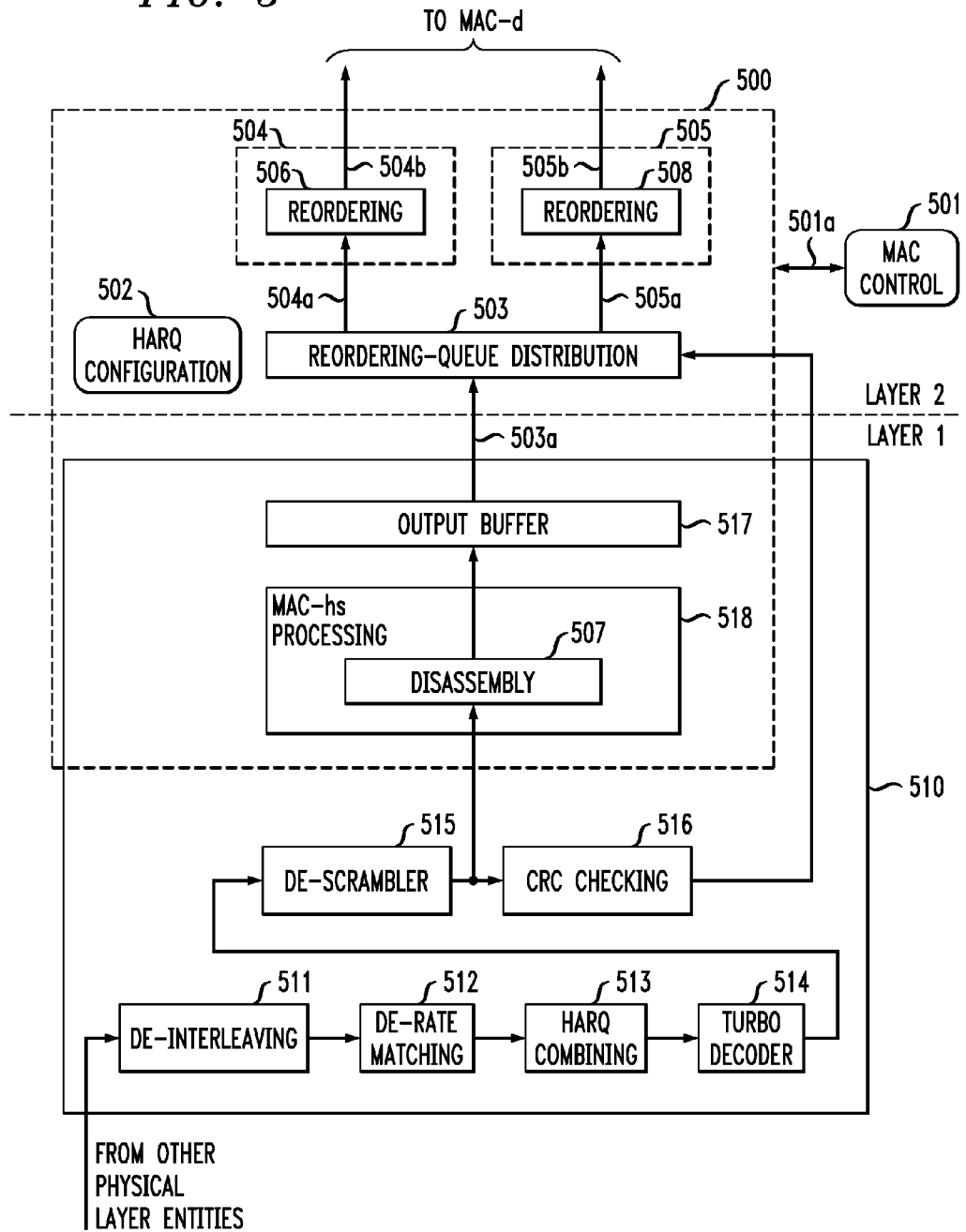
FIG. 5 shows a simplified block diagram of a MAC-hs entity and a transport channel processing module in accordance with an embodiment of the present invention.

FIG. 5 shows a simplified block diagram of MAC-hs entity 500 and transport channel processing module 510 in accordance with an embodiment of the present invention. Elements in FIG. 5 that are similar to elements in FIG. 3 and FIG. 4 are similarly labeled, but with a different prefix.

Transport channel processing module 510 is implemented in a baseband processor and comprises de-interleaving module 511, de-rate matching module 512, HARQ combining module 513, turbo decoder 514, de-scrambler 515, CRC checking module 516, MAC-hs processing module 518, and output buffer 517, which, unless otherwise indicated, all operate in substantially the same way as the corresponding elements in FIG. 4. MAC-hs processing module 518 is part of both channel processing module 510 and MAC-hs entity 500. MAC-hs processing module 518 comprises disassembly entity 507 which performs the disassembly functions of MAC-hs module 500. Output buffer 517 is also part of both channel processing module 510 and MAC-hs entity 500. In an alternative implementation, output buffer 517 is outside of MAC-hs entity 500.

MAC-hs module 500 comprises disassembly entity 507, HARQ configuration module 502, reordering-queue distribution module 503, and reordering queues 504 and 505 comprising respective reordering entities 506 and 508. MAC-hs module 500 is controlled by MAC-control module 501. HARQ configuration module 502, reordering-queue distribution module 503, and reordering queues 504 and 505, including respective reordering entities 506 and 508, are implemented in a PS processor.

An example of the operation of transport channel processing module 510 and MAC-hs entity 500 is provided next. A transport block output by de-scrambler 515 is provided to both CRC checking module 516 and MAC-hs processing module 518. CRC checking module 516 performs a CRC check on the transport block as described above. If CRC checking module 516 determines that the transport block was correctly transmitted, then CRC checking module 516 provides to reordering-queue distribution entity 503 a data read signal, i.e., an alert to read the contents of output buffer 517. The alert may be in the form of a software interrupt. If CRC checking takes longer than disassembly, then the interrupt can be for an immediate read of the contents of output buffer 517. If CRC checking module 516 determines that the transport block was not correctly transmitted, then CRC checking module 516 does not provide a data read signal to reordering-queue distribution entity 503. Instead, CRC checking module 516 causes the transmission of a NACK to a corresponding Node-B so that the transport block is retransmitted. Regardless of whether or not reordering-queue distribution entity 503 reads the contents of output buffer 517, those contents are overwritten by the output of disassembly entity 507 for the next transport block.

In parallel to the CRC checking performed by CRC checking module 516, the constituent MAC-hs PDU of the transport block is processed by disassembly entity 507, which outputs, to output buffer 517, modified MAC-hs PDUs or enveloped constituent MAC-d PDUs, as described in above-cited PCT Patent Application No. PCT/US07/61766, The contents of output buffer 517 are available for reading by reordering-queue distribution entity 503. Above-cited PCT Patent Application No. PCT/US07/61766 also describes the reordering-queue distribution performed by, e.g., reordering-queue distribution entity 503 and the operation of reordering queues and entities such as reordering queues 504 and 505 and corresponding reordering entities 506 and 508.

Figure 6:
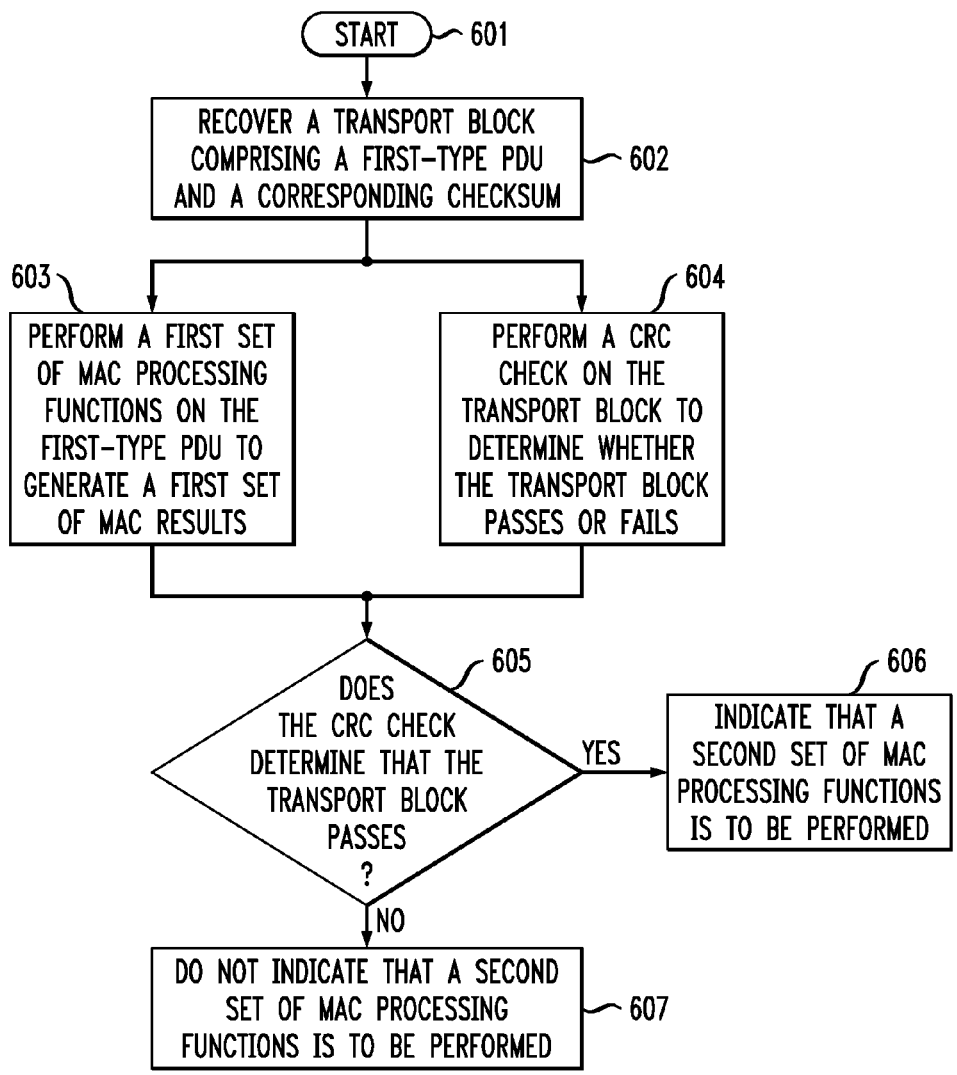
FIG. 6 shows a flow chart for an exemplary segment of a method of operation for a transport channel processing module of FIG. 4.

FIG. 6 shows a flow chart for an exemplary segment of a method of operation for transport channel processing module 410 of FIG. 4. Following the start of the method (step 601), transport channel processing module 410 recovers a transport block comprising a first-type PDU and a corresponding checksum (step 602). Next, transport channel processing module 410 performs, substantially in parallel, a first set of MAC processing functions on the first-type PDU to generate a first set of MAC results (step 603), and a CRC check on the transport block to determine whether the transport block passes or fails (step 604). If the CRC check determines that the transport block passes (step 605), then transport channel processing module 410 indicates that a second set of MAC processing functions is to be performed on the first-type PDU (step 606). Otherwise, transport channel processing module 410 does not indicate that the second set of processing functions is to be performed on the first-type PDU (step 607).

Exemplary embodiments have been described using TS 25.321 and TS 25.212 terms and Release 5 of the 3GPP standard. However, the invention is not limited to TS 25.321, TS 25.212, Release 5, or 3GPP implementations. The invention is applicable to any suitable communication standard that is adapted, as part of data transmission, to disassemble and reorder received data packets. The invention is also applicable to such suitable communication standards that are also adapted to decrypt the received data packets.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

As used herein, the term "mobile phones" refers generically to mobile wireless telephony communication devices, and includes mobile communication devices that function as telephones, as well as mobile communication devices that do not necessarily function as telephones, e.g., a mobile device that transmits instant messages and downloads streaming audio, but is not adapted to be held up to a user's head for telephonic conversation.

As used herein, the term "buffer" and its variants refer to a dynamic computer memory that is preferably adapted to have its present contents repeatedly overwritten with new data. To buffer particular data, an entity can have a copy of that data stored in a determined location, or the entity can be made aware of the memory location where a copy of that data is already stored.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

As used herein in reference to data structures, such as MAC PDUs and their components, the term "modified" and its variants indicate that in a particular embodiment the particular data structure may be modified from the 3GPP standard form for that particular data structure in that context in order to achieve some purpose, such as address-alignment, but does not necessarily require a particular transformation.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A method for processing a transport block in a receiver in a communication network, the method comprising:
   (a) recovering the transport block comprising a first-type protocol data unit (PDU) and a corresponding checksum;
   (b) performing, in parallel:
       (i) a first set of media access control (MAC) processing functions on the first-type PDU to generate a first set of MAC results; and
       (ii) a cyclic redundancy check (CRC) on the transport block to determine whether the transport block passes or fails, wherein:
           (A) if the CRC check determines that the transport block passes, then indicating that a second set of MAC processing functions is to be performed; and
           (B) if the CRC check determines that the transport block fails, then not indicating that the second set of MAC processing functions is to be performed,
       wherein:
   the receiver has a protocol stack comprising a physical layer and a data-link layer;
   the steps of (a) recovering the transport block and (b) performing (i) the first set of MAC processing functions and (ii) the CRC check are performed in the physical layer; and
   the second set of MAC processing functions is performed in one of the physical layer and the data-link layer.

2. The method of claim 1, wherein the communication network is a 3GPP (Third Generation Partnership Project)-compatible wireless communication network.

3. The method of claim 2, wherein the receiver is part of a 3GPP-compatible UE (User Equipment).

4. The method of claim 3, wherein the receiver is compatible with HSDPA (High-Speed Downlink Packet Access) protocol.

5. The method of claim 1, wherein the first-type PDU is a MAC-hs (MAC-high speed) PDU.

6. The method of claim 5, wherein the first set of MAC processing functions comprises disassembly of the MAC-hs PDU.

7. The method of claim 6, wherein the disassembly results in a modified MAC-hs PDU.

8. The method of claim 6, wherein the MAC-hs PDU comprises one or more MAC-d (MAC-dedicated) PDUs and the disassembly results in the one or more MAC-d PDUs.

9. The method of claim 5, wherein:
   the second set of MAC processing functions is performed in the physical layer; and
   the second set of MAC processing functions comprises reordering-queue distribution and reordering of the first set of MAC results.

10. The method of claim 1, wherein the steps of (a) recovering the transport block and (b) performing (i) the first set of MAC processing functions and (ii) the CRC check are performed in a transport channel processing module.

11. The method of claim 1, wherein the step of recovering comprises performing, on a received data stream, one or more of de-interleaving, de-rate matching, HARQ (hybrid auto repeat request) combining, turbo decoding, and de-scrambling.

12. The method of claim 1, wherein:
the first set of MAC processing functions comprises disassembly of the first-type PDU to generate the first set of MAC results;
the first set of MAC results is stored in an output buffer prior to commencing the performance of the second set of MAC processing functions; and
the second set of MAC processing functions comprises reordering-queue distribution and reordering of the first set of MAC results.

13. The method of claim 12, wherein the indicating of step (b)(ii) comprises generating an interrupt that causes the content of the output buffer to be read by an appropriate entity that is to perform one or more of the second set of MAC processing functions.

14. The method of claim 13, wherein:
the first-type PDU is a MAC-hs (MAC-high speed) PDU;
the first set of MAC processing functions comprises disassembly of the MAC-hs PDU;
the second set of MAC processing functions is performed in the physical layer;
the second set of MAC processing functions comprises reordering-queue distribution and reordering of the first set of MAC results; and
the appropriate entity is a reordering-queue distribution module.

15. The method of claim 12, wherein the output buffer is implemented in the physical layer.

16. The method of claim 1, wherein the steps of (a) recovering the transport block and (b) performing (i) the first set of MAC processing functions and (ii) the CRC check are performed by a baseband processor adapted to implement the physical layer of the receiver.

17. The method of claim 16, wherein one or more of the second set of MAC processing functions are performed by the baseband processor.

18. The method of claim 16, wherein one or more of the second set of MAC processing functions are performed by an Advanced RISC Machine (ARM) processor adapted to implement the data-link layer of the receiver.

19. A receiver for a communication network, the receiver adapted to process a transport block, the receiver comprising:
(a) a first processor;
(b) one or more processing entities adapted to recover the transport block comprising a first-type PDU and a corresponding checksum;
(c) a first MAC entity adapted to perform a first set of MAC processing functions on the first-type PDU to generate a first set of MAC results, wherein the first set of MAC processing functions comprises disassembly of the first-type PDU to generate the first set of MAC results; and
(d) a CRC check entity adapted to perform, in parallel with the first MAC entity, a CRC check on the transport block to determine whether the transport block passes or fails, wherein:
(i) if the CRC check entity determines that the transport block passes, then the CRC check entity indicates that a second set of MAC processing functions is to be performed; and
(ii) if the CRC check determines that the transport block fails, then the CRC check entity does not indicate that the second set of MAC processing functions is to be performed, wherein:
the receiver has a protocol stack comprising a physical layer and a data-link layer;
the recovery of the transport block, the first set of MAC processing functions, and the CRC check are performed in the physical layer; and
the second set of MAC processing functions is performed in one of the physical layer and the data-link layer.

20. The receiver of claim 19, wherein:
the first processor is a baseband processor;
the receiver further comprises a protocol stack (PS) processor;
the PS processor is adapted to implement the data-link layer; and
the baseband processor is adapted to implement the physical layer.

21. The receiver of claim 20, wherein:
the communication network is a 3GPP-compatible wireless communication network;
the first-type PDU is a MAC-hs PDU;
the second set of MAC processing functions comprises reordering-queue distribution and reordering of the first set of MAC results;
the second set of MAC processing functions is performed by the baseband processor.

22. The method of claim 1, wherein the first set of MAC processing functions comprises disassembly of the first-type PDU to generate the first set of MAC results.

\* \* \* \* \*

UNITED STATES PATENT AND TRADEMARK OFFICE
CERTIFICATE OF CORRECTION

PATENT NO. : 8,331,386 B2
APPLICATION NO. : 11/755999
DATED : December 11, 2012
INVENTOR(S) : Rafael Carmon and Simon Issakov It is certified that error appears in the above-identified patent and that said Letters Patent is hereby corrected as shown below:

In column 10, line 17, cancel the text beginning with "1. A method for" to and ending "the data-link layer." in column 10, line 43, and insert the following claim:

--1. A method for processing a transport block in a receiver in a communication network, the method comprising:
    (a) recovering the transport block comprising a first-type protocol data unit (PDU) and a corresponding checksum;
    (b) performing, in parallel:
        (i) a first set of media access control (MAC) processing functions comprising disassembly of the first-type PDU to generate a first set of MAC results; and
        (ii) a cyclic redundancy check (CRC) on the transport block to determine whether the transport block passes or fails, wherein:
            (A) if the CRC check determines that the transport block passes, then indicating that a second set of MAC processing functions is to be performed; and
            (B) if the CRC check determines that the transport block fails, then not indicating that the second set of MAC processing functions is to be performed, wherein:
    the second set of MAC processing functions comprises at least one of reordering-queue distribution and reordering of the first set of MAC results;
    the first set of MAC results is stored in an output buffer prior to commencing the performance of the second set of MAC processing functions;
    the receiver has a protocol stack comprising a physical layer and a data-link layer;
    the steps of (a) recovering the transport block and (b) performing (i) the first set of MAC processing functions and (ii) the CRC check are performed in the physical layer; and
    the second set of MAC processing functions is performed in one of the physical layer and the data-link layer.--

Signed and Sealed this
Nineteenth Day of March, 2013

Teresa Stanek Rea
*Acting Director of the United States Patent and Trademark Office*

CERTIFICATE OF CORRECTION (continued)
U.S. Pat. No. 8,331,386 B2

In column 11, line 10, cancel the text beginning with "12. The method of" to and ending "of MAC results." in column 11, line 19, and insert the following claim:

--12. The method of claim 1, wherein the second set of MAC processing functions comprises reordering-queue distribution and reordering of the first set of MAC results.--

In Column 12, line 1, cancel the text beginning with "19. A receiver for" to and ending "the data-link layer." in column 12, line 30, and insert the following claim:

--19. A receiver for a communication network, the receiver adapted to process a transport block, the receiver comprising:
    (a) a first processor;
    (b) one or more processing entities adapted to recover the transport block comprising a first-type PDU and a corresponding checksum;
    (c) a first MAC entity adapted to perform a first set of MAC processing functions comprising disassembly of the first-type PDU to generate a first set of MAC results;
    (d) an output buffer; and
    (e) a CRC check entity adapted to perform, in parallel with the first MAC entity, a CRC check on the transport block to determine whether the transport block passes or fails, wherein:
        (i) if the CRC check entity determines that the transport block passes, then the CRC check entity indicates that a second set of MAC processing functions is to be performed; and
        (ii) if the CRC check determines that the transport block fails, then the CRC check entity does not indicate that the second set of MAC processing functions is to be performed, wherein:
    the first set of MAC results is stored in the output buffer prior to commencing the performance of the second set of MAC processing functions;
    the second set of MAC processing functions comprises at least one of reordering-queue distribution and reordering of the first set of MAC results;
    the receiver has a protocol stack comprising a physical layer and a data-link layer;
    the recovery of the transport block, the first set of MAC processing functions, and the CRC check are performed in the physical layer; and
    the second set of MAC processing functions is performed in one of the physical layer and the data-link layer.--